US005833225A

United States Patent [19]

Weber

[11] Patent Number: 5,833,225

[45] Date of Patent: Nov. 10, 1998

[54] GRIPPING DEVICE

[76] Inventor: Gene Weber, 5373 E. Lowe, Fresno, Calif. 93727

[21] Appl. No.: 944,560

[22] Filed: Oct. 6, 1997

Related U.S. Application Data

[63] Continuation-in-part of Ser. No. 840,935, Apr. 25, 1997, which is a continuation-in-part of Ser. No. 555,869, Nov. 13, 1995, Pat. No. 5,624,106.

[51] Int. Cl.[6] .......... B23Q 3/02

[52] U.S. Cl. .......... 269/138; 269/234; 269/141; 269/229; 411/354; 411/393

[58] Field of Search .......... 269/234, 138, 269/134, 141, 165, 204, 229, 235, 254 R; 141/354, 393

[56] References Cited

U.S. PATENT DOCUMENTS

| | | | |
|---|---|---|---|
| 2,430,613 | 11/1947 | Hodge . | |
| 2,587,025 | 2/1952 | Beck et al. . | |
| 2,637,249 | 5/1953 | Swenson . | |
| 3,473,420 | 10/1969 | Boggs . | |
| 3,506,253 | 4/1970 | Swenson . | |
| 4,805,888 | 2/1989 | Bishop . | |
| 4,867,428 | 9/1989 | Fricker | 269/138 |
| 4,915,367 | 4/1990 | Carossino . | |
| 5,129,637 | 7/1992 | Ito et al. . | |
| 5,226,637 | 7/1993 | Kitaura et al. | 269/234 |
| 5,310,299 | 5/1994 | Bernstein | 269/229 |
| 5,624,106 | 4/1997 | Weber | 269/138 |
| 5,641,257 | 6/1997 | Bernstein | 269/234 |
| 5,718,420 | 2/1998 | Bernstein | 269/138 |

*Primary Examiner*—James G. Smith
*Assistant Examiner*—Lee Wilson
*Attorney, Agent, or Firm*—Merek & Voorhees

[57] ABSTRACT

A gripping device including a fixture having a working surface and at least one hole. A stop rises above the working surface of the fixture. A threaded fastener is provided to screw into the at least one hole in the working surface of the fixture. A gripping member is provided such that a work piece can be held in a stationary fashion between the gripping member and another element such as a stop. The gripping member includes a conical bore and an elongated bore. The elongated bore is a through bore in that it extends through the entire thickness of the gripping member. The conical bore extends through only a portion of the thickness of the gripping member. The fastener extends through both the conical and elongated bores. The elongated bore is offset towards the gripping face of the gripping element thereby enabling the gripping member to travel to an from the work piece a greater distance than gripping members employing a centrally located circular through bore. In addition, the elongated bore restricts the travel of the gripping member in a direction transverse to the direction of travel to and from the work piece.

20 Claims, 2 Drawing Sheets

GRIPPING DEVICE

CROSS REFERENCE TO RELATED APPLICATIONS

The subject application is a continuation-in-part of U.S. patent application Ser. No. 08/840,935 which is a continuation-in-part of U.S. patent application Ser. No. 08/555,869, filed Nov. 13, 1995 now U.S. Pat. No. 5,624,106.

FIELD OF THE INVENTION

The present invention relates generally to machine tools and more particularly to a device for clamping, gripping or otherwise holding a work piece.

The present invention is particularly useful with repetitive production and/or preprogrammed machinery. However, the present invention is not limited to use with repetitive production and/or preprogrammed machinery but rather can be utilized in a variety of applications requiring that a work piece be maintained stationary.

BACKGROUND OF THE INVENTION

Numerous mechanical operations require that one or more work pieces be held stationary for a given period of time. A variety of clamping, gripping or holding devices have previously been developed for securing a work piece in a stationary position for a given period of time. One such device is described in my previously obtained patent, i.e., U.S. Pat. No. 5,624,106 the entire contents of which is herein incorporated by reference. The invention disclosed in my '106 patent is superior to previously developed clamping, gripping or holding devices, inter alia, because the patented device imparts both vertical and horizontal gripping forces to maintain a work piece in a stationary position. Another device designed to maintain a work piece in a stationary position is disclosed in my co-pending U.S. patent application Ser. No. 08/840,935 the entire contents of which is incorporated by reference. The '935 patent application discloses a novel and unobvious two-piece gripping device for maintaining one or more work pieces stationary for a given period of time.

A further clamping or holding device is that disclosed in U.S. Pat. No. 5,310,299. This particular clamping device has a number of draw backs some of which are discussed in my previously identified Patent and Patent Application. In addition to those I have previously discussed, the clamping device disclosed in the '299 patent has an inherent disadvantage to its design. Specifically, the movement of the clamping member to and from the work piece is unnecessarily limited by the diameter of the centrally located through bore. As such, the clamping member can not readily accommodate work pieces deviating in size.

OBJECTS AND SUMMARY OF THE INVENTION

An object of the present invention is to provide a novel and unobvious gripping device for maintaining a work piece in a stationary position.

Another object of the present invention is to provide a relatively simple and inexpensive gripping device for maintaining a work piece in a stationary position.

A further object of the present invention is to provide a gripping device which can readily accommodate work pieces deviating from a given size.

Yet another object of the present invention is to provide a gripping member which is not limited in travel to and from a given work piece by the size of a centrally located through bore.

These and other objects of the present invention will be readily apparent upon review of the following detailed description of the invention and the accompanying drawings. These objects of the present invention are not exhaustive and are not to be construed as in any way limiting the scope of the claimed invention.

In summary, a preferred embodiment of a gripping device formed in accordance with the present invention includes a fixture such as a platen having a working surface and at least one hole. A stop rises above the working surface of the fixture. A threaded fastener is provided to screw into the at least one hole in the working surface of the fixture. A gripping member is provided such that a work piece can be held in a stationary fashion between the gripping member and a stop. The gripping member includes a conical bore and an elongated bore. The elongated bore is a through bore in that it extends through the entire thickness of the gripping member. The conical bore extends through only a portion of the thickness of the gripping member. The fastener extends through both the conical and elongated bores. The elongated bore is offset towards the gripping face of the gripping element thereby enabling the gripping member to travel to an from the work piece a greater distance than gripping members employing a centrally located circular through bore. In addition, the elongated bore restricts the travel of the gripping member in a direction transverse to the direction of travel to and from the work piece.

The above summary of the invention describes a preferred form and is not in any way to be construed as limiting the claimed invention to the preferred form.

DETAILED DESCRIPTION OF THE INVENTION

The preferred embodiment of the present invention will now be described with reference to FIGS. 1 through 7.

FIGS. 1 THROUGH 7

Figure 1:
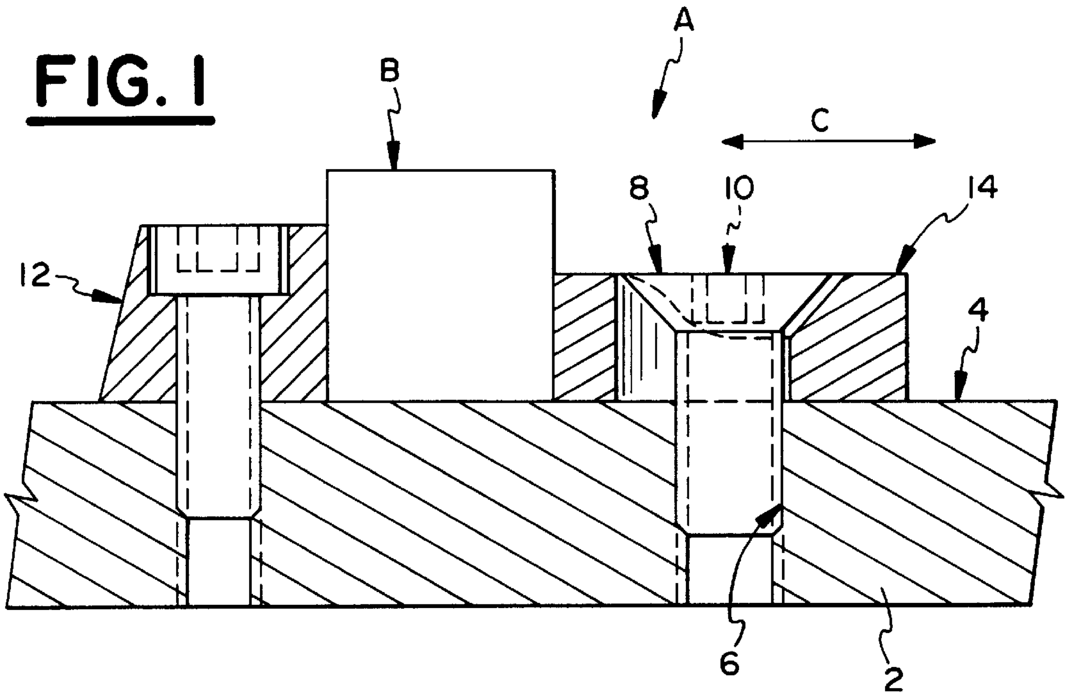
FIG. 1 is a cross-sectional view of the preferred embodiment of the present invention with the gripping element engaging the work piece.

Referring to FIG. 1, the preferred form of the gripping device A includes a fixture 2 having a horizontal work surface 4. A threaded hole 6 extends through the work surface 4 and receives threaded fastener 8. Threaded fastener 8 includes a hexagonal shaped recess 10 for receiving a similarly shaped locking key. It will be readily appreciated by those of ordinary skill in the art that the head of threaded fastener 8 may be configured in numerous other manners to receive other conventional tooling. The gripping device A further includes a stop 12 and a gripping element or member 14. The stop 12 is secured to the fixture 2 by conventional fasteners. The gripping element or member 14 includes an elongated through bore 16 and a conical bore 18, as seen in FIG. 3. The conical bore 18 has an outermost circumference $C_o$, a portion of which is shown by dotted lines. The conical bore 18 is formed at an 82° countersink. The gripping element 14 further includes a gripping face 20, as seen in FIG. 2.

The preferred dimensions of gripping element 14 are: 1.0"(length)×¾"(width)×⅜"(height). The preferred dimensions of the elongated bore 16 are: ½"(length)×0.320" (width). Of course, it will be readily appreciated by those of ordinary skill in the art that these dimensions are merely preferred and can be readily varied.

Figure 2:
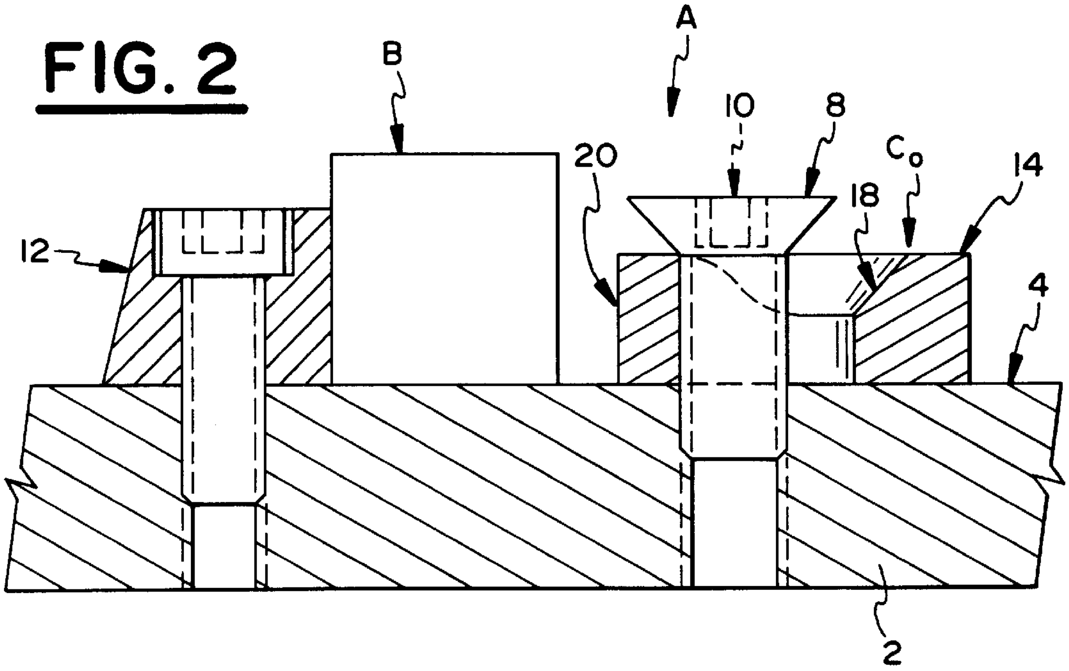
FIG. 2 is a cross-sectional view of the preferred embodiment of the present invention with the gripping element backed-off from the work piece.
Figure 3:
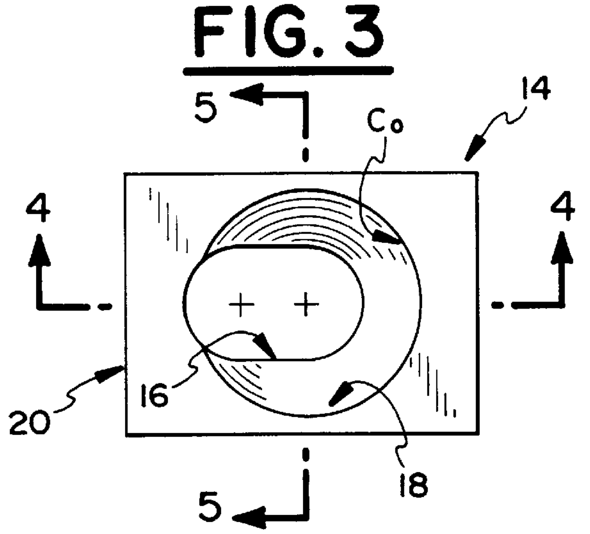
FIG. 3 is a plan view of the gripping element.
Figure 4:
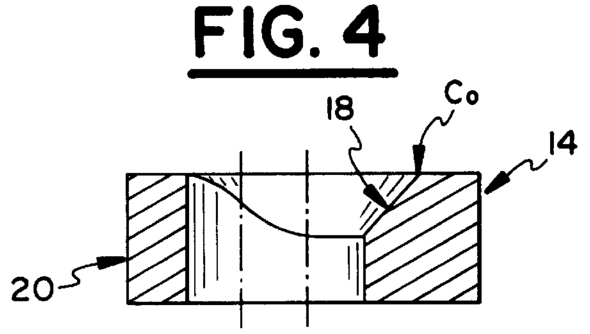
FIG. 4 is a cross-sectional view of the gripping element taken along line 4—4 in FIG. 3.
Figure 5:
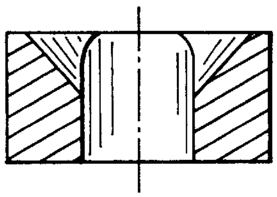
FIG. 5 is a cross-sectional view of the gripping element taken along line 5—5 in FIG. 3.

Referring to FIGS. 1 and 2, the gripping element 14 slides back and forth along the work surface 4 to clamp and release the work piece B. The directions of travel of work piece B are indicated by arrow C. As seen in FIGS. 3 to 7, the elongated through bore 16 is offset towards gripping face 20. In fact, the elongated through bore 16 intersects and extends beyond the outermost circumference $C_o$ of conical bore 18. This feature enables the gripping element 14 to move a greater distance from the work piece B than an arrangement having a centrally located through bore. In addition, the elongated through bore 16 restricts movement of the gripping member 14 transverse to the direction of travel indicated by arrow C in FIG. 1.

OPERATION OF THE PREFERRED EMBODIMENT

The manner of operation of the preferred form of gripping unit A will now be described. Referring to FIG. 2, the gripping member 14 is disengaged from the work piece B. Specifically, the shank of threaded fastener 8 abuts the left side of the elongated bore 16. In this position, the threaded shank is partially backed out of the threaded opening 6. The work piece B can be readily removed from the gripping unit A due to the spacing between the gripping face 20 and the work piece B created by the offset, elongated through bore 16. Further, in the event that the size of the work piece B varies for whatever reason, the gripping unit A will still be able to accommodate the work piece B due to the greater degree of movement of the gripping element 14 provided by the offset, elongated through bore 16.

Figure 6:
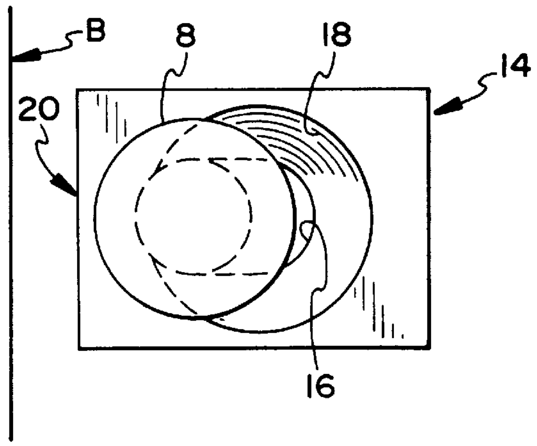
FIG. 6 is a plan view of the gripping element and the fastener with the gripping element backed-off from the work piece.
Figure 7:
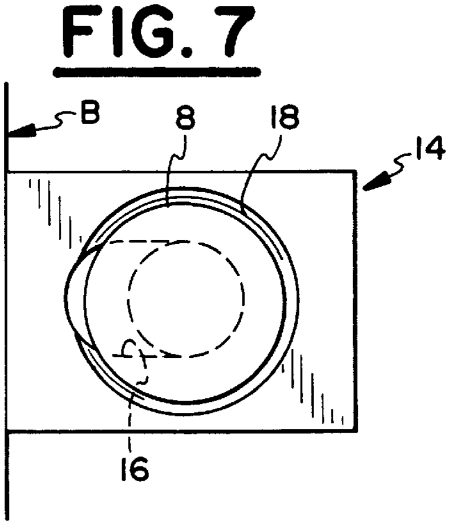
FIG. 7 is a plan view of the gripping element and the fastener with the gripping element engaging the work piece.

In order to clamp the work piece B in a stationary position, a conventional tool is used to screw fastener 8 into the threaded opening 6. As the fastener 8 progresses downwardly, the tapered head engages the conical bore 18 causing the gripping element 14 to move toward and grip the work piece B, as seen in FIGS. 1 and 7. To release the work piece B, the fastener 8 is backed out of the opening 6. As seen in FIGS. 2 and 6, once fastener 8 is backed out of the opening 6 a sufficient distance, the gripping element 14 can be readily moved away from the work piece B. The offset elongated slot 16 permits the gripping element 14 to be moved away from the work piece B a greater distance than conventional gripping elements which commonly employ a concentrically located through bore. In addition, the shape of the elongated slot 16 deters movement of the gripping element 14 in a direction transverse to the direction of travel indicated by arrow C.

It should be noted that the stop 12 described in the preferred embodiment may be omitted. In such an arrangement, gripping element 14 would be oriented in a vertical fashion with the gripping face 20 extending in a plane parallel to the working surface 4. In such an arrangement, the work piece would be clamped between the working surface 4 and the gripping element 14. A conventional bracket would be used to support the gripping element 14 vertically.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

I claim:

1. A gripping device for holding a work piece, comprising:

(a) a fixture having a working surface and at least one hole;

(b) a stop rising above said working surface;

(c) a fastener;

(d) a gripping member having an elongated bore and a conical bore; and, (e) said fastener passes through said conical bore and said elongated bore.

2. The device as set forth in claim 1, wherein:

(a) said elongated bore is a through bore.

3. The device as set forth in claim 2, wherein:

(a) said conical bore passes through only a portion of said gripping member.

4. The device as set forth in claim 1, wherein:

(a) said at least one hole is threaded;

(b) said fastener includes a threaded shank; and (c) said threaded shank of said fastener is received in said threaded hole securing said fastener to said fixture.

5. The device as set forth in claim 1, wherein:

(a) said stop is a block pinned to said working surface of said fixture.

6. A device as set forth in claim 1, wherein:

(a) said fastener includes a tapered head for bearing against said conical bore.

7. A device as set forth in claim 1, wherein:

(a) said fastener includes a recess formed in said tapered head for receiving a tool for turning said fastener.

8. A device for holding a work piece, comprising:

(a) a fixture having a working surface and at least one hole;

(b) a stop rising above said working surface;

(c) a fastener;

(d) a gripping member operably associated with said fastener, said gripping member includes an elongated bore and a conical bore;

(e) said conical bore having an outermost circumference; and (f) said elongated bore having first and second ends, said first end of said elongated bore is positioned adjacent said outermost circumference of said conical bore.

9. The device as set forth in claim 8, wherein:

(a) said elongated bore is a through bore.

10. The device as set forth in claim 9, wherein:

(a) said conical bore passes through only a portion of said gripping member.

11. The device as set forth in claim 8, wherein:

(a) said gripping member is formed from a single piece.

12. The device as set forth in claim 8, wherein:

(a) said fastener passes through said elongated bore and said conical bore.

13. The device as set forth in claim 8, wherein:

(a) said stop is a block pinned to said working surface of said fixture.

14. The device as set forth in claim 8, wherein:

(a) said at least one hole is threaded;

(b) said fastener has a threaded shank; and (c) said threaded shank of said fastener is received in said threaded hole securing said fastener to said fixture.

15. The device as set forth in claim 8, wherein:

(a) said elongated bore intersects said outermost circumference of said conical bore.

16. A device for holding a work piece on a fixture, comprising:

(a) a gripping member having an elongated bore and a conical bore;

(b) said conical bore having an outermost circumference; and (c) a segment of said elongated bore intersects said outermost circumference of said conical bore.

17. The device as set forth in claim 16, wherein:

(a) said elongated bore is a through bore.

18. The device as set forth in claim 16, wherein:

(a) said gripping member is substantially rectangular in shape.

19. The device as set forth in claim 16, wherein:

(a) said elongated bore includes a longitudinal axis, said longitudinal axis is oriented in a direction of travel of said gripping member.

20. The device as set forth in claim 16, wherein:

(a) said elongated bore includes first and second ends, said elongated bore intersects said outermost circumference of said conical bore adjacent said first end, and said second end of said elongated bore is disposed inwardly of said outermost circumference of said conical bore.

* * * * *